United States Patent
Mesgarani et al.

(10) Patent No.: US 12,481,572 B2
(45) Date of Patent: Nov. 25, 2025

(54) CONTROL OF COMPUTER SYSTEM OPERATION USING SENSOR DATA

(71) Applicant: Apple Inc., Cupertino, CA (US)

(72) Inventors: Ali Mesgarani, Sunnyvale, CA (US); Farzan Farbiz, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 650 days.

(21) Appl. No.: 17/477,129

(22) Filed: Sep. 16, 2021

(65) Prior Publication Data
US 2023/0084259 A1   Mar. 16, 2023

(51) Int. Cl.
| | | |
|---|---|---|
| G06F 1/32 | (2019.01) | |
| G06F 1/3237 | (2019.01) | |
| G06F 11/30 | (2006.01) | |
| G06F 11/34 | (2006.01) | |

(52) U.S. Cl.
CPC ........ *G06F 11/3452* (2013.01); *G06F 1/3237* (2013.01); *G06F 11/3055* (2013.01); *G06F 11/3058* (2013.01); *G06F 11/3089* (2013.01); *G06F 11/3409* (2013.01); *G06F 2201/81* (2013.01)

(58) Field of Classification Search
CPC .............. G06F 11/3452; G06F 1/3237; G06F 11/3055; G06F 11/3058; G06F 11/3089; G06F 11/3409; G06F 2201/81; G06F 1/20; G06F 1/30; G06F 1/3206; G06F 1/3234; G06F 1/28
See application file for complete search history.

(56) References Cited

U.S. PATENT DOCUMENTS

| | | | |
|---|---|---|---|
| 9,509,707 B2 | 11/2016 | Patne et al. | |
| 9,774,614 B2 | 9/2017 | Patne et al. | |
| 10,337,932 B2 | 7/2019 | Krishnaswamy et al. | |
| 10,571,313 B2 | 2/2020 | Guilley et al. | |
| 10,942,562 B2* | 3/2021 | Qawami | H04N 19/136 |
| 2012/0244843 A1* | 9/2012 | Dillahunt | H04W 8/18 |
| | | | 455/414.1 |
| 2013/0030746 A1* | 1/2013 | Vaissiere | G01F 25/00 |
| | | | 702/88 |
| 2013/0103348 A1* | 4/2013 | Cao | H04M 1/72454 |
| | | | 702/181 |
| 2014/0366042 A1* | 12/2014 | Chan | G06F 1/3212 |
| | | | 719/318 |

(Continued)

FOREIGN PATENT DOCUMENTS

JP   2022034688 A   *   3/2022

*Primary Examiner* — Eyob Hagos
(74) *Attorney, Agent, or Firm* — Kowert, Hood, Munyon, Rankin & Goetzel, P.C.; Scott W. Pape; Dean M. Munyon

(57) ABSTRACT

A computer system may include multiple sensor circuits that monitor operation parameters of a computer system circuit in the computer system. A control circuit may use monitor signals generated by the sensor circuits to determine probabilities that the operation parameters are within corresponding ranges. The control circuit can use the determined probabilities to generate a combined probability, which can be compared to a threshold value. The operation of the computer system circuit can be adjusted by the control circuit using results of the comparison between the combined probability and the threshold value.

20 Claims, 11 Drawing Sheets

(56) References Cited

U.S. PATENT DOCUMENTS

| | | | |
|---|---|---|---|
| 2015/0346065 A1* | 12/2015 | Ramaswamy | G01M 99/008 |
| | | | 702/183 |
| 2015/0350885 A1* | 12/2015 | Stanley-Marbell | G06F 9/542 |
| | | | 455/418 |
| 2017/0089769 A1* | 3/2017 | Krishnaswamy | G01K 15/005 |
| 2018/0054163 A1 | 2/2018 | Chen et al. | |
| 2018/0095004 A1* | 4/2018 | Ide | G06N 7/01 |
| 2018/0314914 A1* | 11/2018 | Kuriyama | G06F 18/2135 |
| 2020/0175407 A1* | 6/2020 | Alam | G06N 7/01 |
| 2020/0178273 A1* | 6/2020 | Lu | H04L 1/1822 |
| 2020/0402019 A1* | 12/2020 | Truong | G06Q 10/1093 |
| 2022/0091658 A1* | 3/2022 | Hayashi | G06F 1/3237 |
| 2022/0163947 A1* | 5/2022 | Michan | G05B 23/0281 |
| 2023/0004471 A1* | 1/2023 | Panesar | G06F 11/3065 |
| 2023/0075065 A1* | 3/2023 | Ivenso | G06N 20/00 |

* cited by examiner

CONTROL OF COMPUTER SYSTEM OPERATION USING SENSOR DATA

BACKGROUND

Technical Field

This disclosure relates to monitoring variations of factors that affect performance of a computer system, in particular to detecting anomalies that result unexpected changes of performance of the computer system.

Description of the Related Art

Modern computer systems may include multiple circuit blocks designed to perform various functions. For example, such circuit blocks may include processors or processor cores configured to execute software or program instructions. Additionally, the circuit blocks may include memory circuits, mixed-signal or analog circuits, and the like.

In some computer systems, the multiple circuit blocks may be designed to operate using different power supply voltage levels and to operate at different frequencies determined by different clock signals. In various embodiments, variations in the levels of the supply voltage, as well as frequencies of the clock signals, may affect performance of the computer system. In a similar fashion, other factors, e.g., ambient temperature, the execution of particular software applications, mechanical shock to the computer system, etc., may similarly affect performance of the computer system.

The effect in performance of a computer system resulting from changes in operation parameters (e.g., voltage level of a power supply), can result in numerous problems. An affected computer system may not properly execute a software program. Alternatively, the affected computer system may inadvertently enter an operation regime that could consume additional power. The processors may monitor and analyze the factors to execute a particular software program or application. The program instructions may enhance the detection of the performance malfunctions of the computer system in terms of the monitoring factors. The instructions may be loaded into a memory circuit included in the computer system. In some cases, during execution of a particular program instruction, a processor or processor core may retrieve a given program instruction from the memory circuit.

SUMMARY OF THE EMBODIMENTS

Various embodiments for a system monitor are disclosed. Broadly speaking, a plurality of monitor circuits are configured to monitor corresponding operation parameters of a computer system circuit, and generate a respective plurality of monitor signals. A control circuit is configured to determine, using the plurality of monitor signals, a plurality of probabilities that corresponding ones of the operation parameters are within corresponding operation ranges. The control circuit is further configured to generate a combined probability using the plurality of probabilities and perform a comparison of the combine probability to a threshold value. The control circuit is also configured to adjust, based on result of the comparison, the operation of the computer system circuit using a plurality of control signals.

DETAILED DESCRIPTION OF EMBODIMENTS

Figure 1:
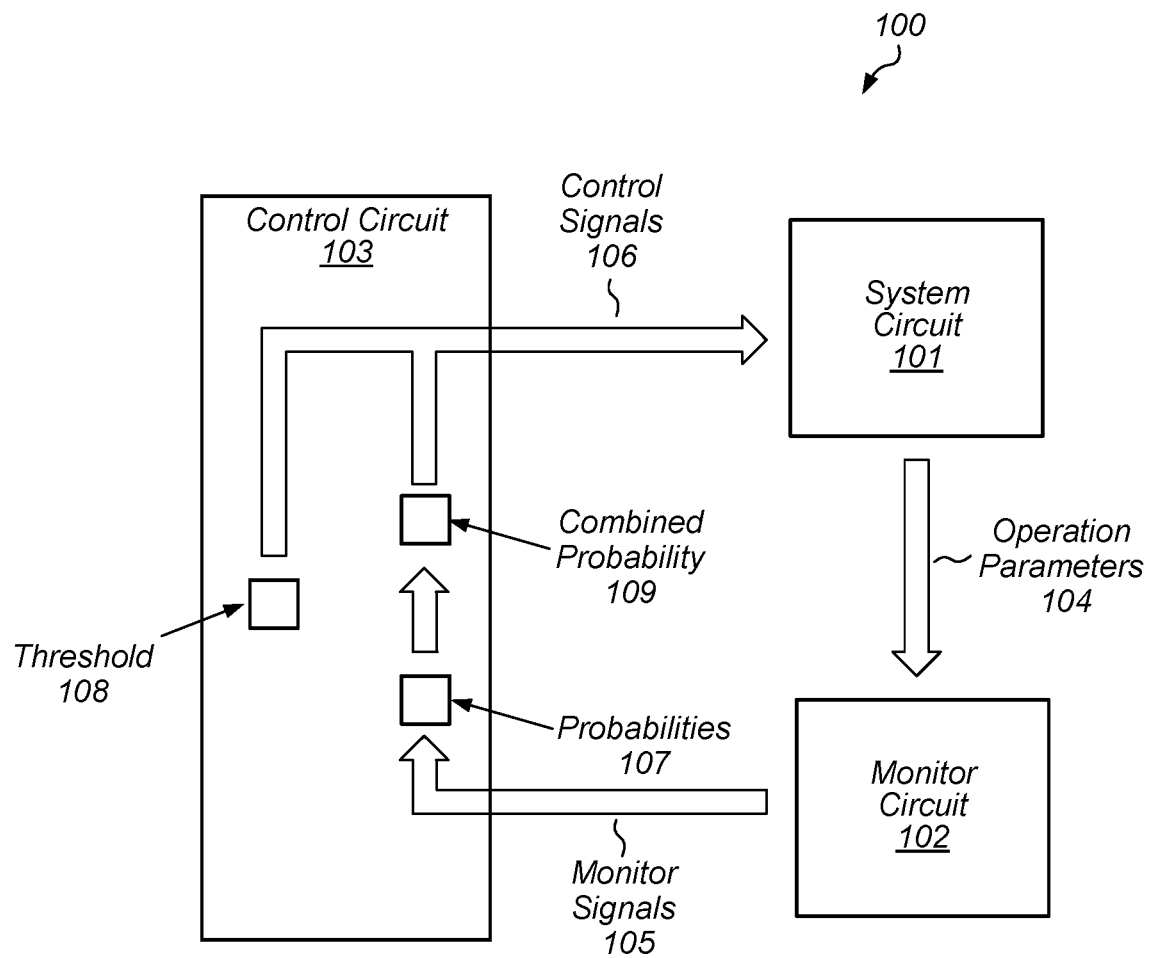
FIG. 1 is a block diagram of an embodiment of a computer system.

Computer systems may execute multiple software programs or applications. During execution of such software programs of applications, abnormal operations may cause undesirable changes in program flow with a software program or application. Such abnormal operations may be the result of various operation parameters exceeding desired limits. As used and defined herein, operation parameters refer to factors that affect the performance and operation of circuits included in a computer system. The operation parameters may include, but not limited to, variations in the levels of the supply voltage, frequencies of the clock signals, temperature, software fault, and critical path conditions as well as the rate of change of such parameters. Excursion of operation parameters from desired levels can have both internal and external causes.

In order to detect excursions from desired operation regimes, monitor circuits (also referred to as "sensor circuits") may be used to compare operation parameters to corresponding threshold values. Such monitor circuits are conventionally designed considering a trade-off between precision and recall. For example, increasing the precision can result in better identification of true positive detections of operation parameters violating their allowed ranges, and less false positive detections where operation parameters are identified as being outside their corresponding range, even when they are not. In a similar fashion, increasing recall improves identification of true positive detections and decreasing a number of false negative detections. The goal of design of a monitor circuit is to minimize impact on design margins while increasing flexibility to detect undesirable operating conditions. Some computer systems may use the output of monitor circuits, to maintain the operation of the computer systems at desired levels.

Some computer systems employ different monitors each using respective threshold values to determine when a particular operation parameter has exceeded a desired range of operation. Such threshold values can vary from one integrated circuit to another, resulting in an uncertainty in a given threshold value for a given integrated circuit. Moreover, different operation parameters can be correlated (e.g., power supply voltage and frequency). Such correlation can result in monitor circuits failing to detect undesirable conditions since the threshold values allow for only checking individual operation parameters, not combinations of operation parameters or interactions between operation parameters. The embodiments illustrated in the drawing and described below may provide techniques for monitoring operation parameters, and detecting undesired operating conditions by determining a combined probability based on respective distributions of monitor circuits results measured over a range of operating conditions. Machine Learning (ML) techniques can be employed to enhance detection of outlying combinations of operation parameters, as well as to comprehend correlated operation parameters, thereby allowing adjustment of the computer system back into a desired operating condition, pausing operation of the computer system, locking access to the computer system, or initiating a shut down on the computer system.

A block diagram of a computer system that employs monitor circuits is depicted in FIG. 1. In the illustrated embodiment, computer system 100 includes computer system circuit 101, monitor circuits 102, and control circuit 103. It is noted that, in some embodiments, computer system circuit 101 and monitor circuits 102 may be located on one integrated circuit, while control circuit 103 may be located on a different integrated circuit. In other embodiments, computer system circuit 101, monitor circuits 102, and control circuit 103 may be located on a common integrated circuit.

Monitor circuit 102 includes one or more monitor circuits including a given monitor circuit configured to monitor a corresponding one of operation parameters 104 of computer system circuit 101 to generate a corresponding one of monitor signals 105. In various embodiments, computer system circuit 101 may be a system-on-a-chip (SoC) and be configured for use in a desktop computer, server, or in a mobile computing application such as, a tablet, laptop computer, or wearable computing device. As described below, monitor circuit 102 can include a variety of different sensor circuits configured to monitor corresponding ones of operation parameters 104 (e.g., temperature).

In various embodiments, monitor signals 105 includes a first monitor signal whose value is indicative of a magnitude of a corresponding one of operation parameters 104 at a given time point, and a second monitor signal whose value is indicative of a time rate of change of the corresponding one of operation parameters 104 over a given time period.

Control circuit 103 is configured to determine probabilities 107 using monitor signals 105. In various embodiments, probabilities 107 correspond to the likelihood that corresponding ones of operation parameters 104 are within corresponding ranges. The control circuit 103 is further configured to generate combined probability 109 using probabilities 107 to, and perform a comparison of combined probability 109 to threshold 108. In various embodiments, control circuit 103 is also configured to adjust, based on a result of the comparison, the operation of computer system circuit 101 using control signals 106.

In various embodiments, to generate combined probability 109, control circuit 103 is further configured to multiply at least a first probability of probabilities 107 and a second probability of probabilities. To determine probabilities 107, control circuit 103 may be configured to integrate a given one of monitor signals 105.

As described below, control circuit 103 may be operated in a training mode that allows for determining distribution parameters associated different sensor circuits included in monitor circuit 102. In response to an activation of a training mode, control circuit 103 is configured to select one or more of monitor signals 105, and collect under one or more operating conditions of computer system circuit 101, data from the one or more of monitor signals 105. Control circuit 103 may be further configured to estimate respective distribution parameters for the one or more of monitor signals 105, and test a function that uses the respective distribution parameters to determine an anomaly threshold.

In various embodiments, the respective distribution parameters include a mean value and a standard deviation value. To allow for user specific parameters to be updated post manufacture, control circuit 103 is further configured to activate the training mode after a particular time period has elapsed. To test the function, control circuit 103 may be further configured to set one or more of the operation parameters to values outside a desired operating regime, and determine a combined probability value using data indicative of monitor signals 105 gathered with the one or more operation parameters set to values outside the desired operating regimes. Control circuit 103 may be further configured to perform a comparison of the combined probability and the anomaly threshold, and adjust the anomaly threshold using result of the comparison.

As described below, control circuit 103 may be implemented in numerous ways. For example, control circuit 103 may include a microcontroller or general-purpose processor configured to execute a software program or application.

Figure 2:
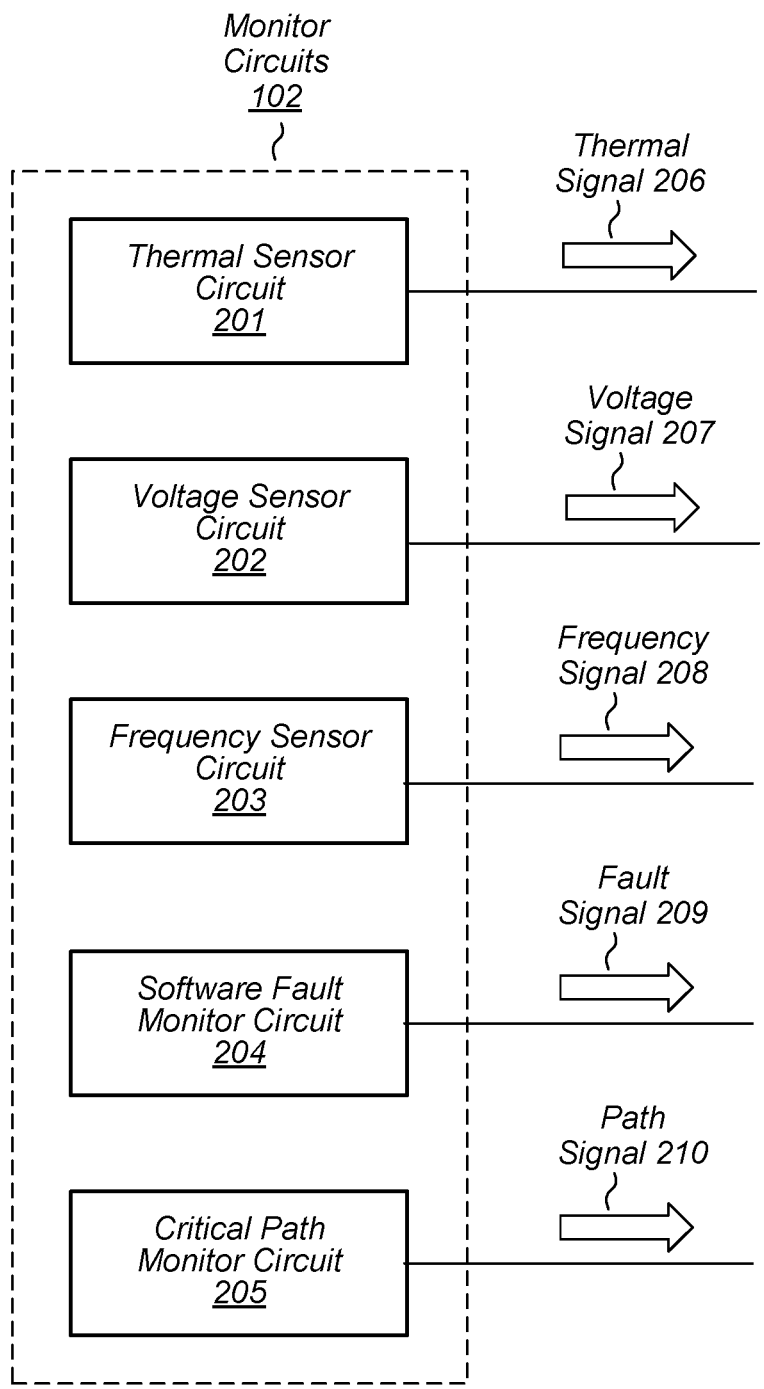
FIG. 2 illustrates a block diagram of an embodiment of a monitor circuit used in a computer system.

As used and defined herein, a monitor (or "sensor") circuit is a circuit that generates a signal whose value is indicative of a measured parameter of a circuit. The parameter may be a physical (e.g., threshold voltage of a transistor, resistance of a wiring trace, temperature of the circuit, etc.), electrical (e.g., voltage level of a power supply node, load current, etc.), or performance characteristic of the circuit (frequency of a clock signal, operations performed per unit time, etc.). A block diagram of monitor circuit 102 is depicted in FIG. 2. As illustrated, monitor circuit 102 includes thermal sensor circuit 201, voltage sensor circuit 202, frequency sensor circuit 203, software fault monitor circuit 204, and critical path monitor circuit 205. Instantaneous values of parameters measured by such sensors circuits, in addition to the rate of change of the parameters can be use as indicators of a state of a computer system. It is noted that term transistor can refer to a bipolar junction transistor ("BJT"), a metal-oxide semiconductor field-effect transistor ("MOSFET"), a Fin field-effect transistor ("FinFET"), a gate-all-around field-effect transistor ("GAAFET"), or any other suitable transconductance device.

Thermal sensor circuit 201 is configured to generate thermal signal 206 based on a temperature of computer system circuit 101. Thermal sensor circuit 201 may be implemented using a variety of circuit techniques. For example, thermal sensor circuit 201 may include a band-gap reference circuit, or any other suitable circuit configured to generate a voltage or current change that varies with temperature. In various embodiments, thermal signal 206 may be an analog signal whose voltage level is indicative of the temperature of computer system circuit 101. In other embodiments, thermal signal 206 may be a digital signal that includes multiple bits whose collective value is indicative of the temperature of computer system circuit 101.

In a similar fashion, voltage sensor circuit 202 is configured to generate voltage signal 207 based on a voltage level of a power supply node included in computer system circuit 101. Voltage sensor circuit 202 may be implemented using various circuit topologies. For example, voltage sensor circuit 202 may include an Analog-to-Digital converter (ADC) circuit, or any other suitable circuit configured to generate a signal indicative of a voltage level of a circuit node. In various embodiments, voltage signal 207 may be a clock signal whose frequency is proportional to the voltage level of a power supply node. In various embodiments, computer system circuit 101 may include multiple different power supply nodes. In such cases, multiple voltage sensors may be employed to monitor the different power supply nodes.

Frequency sensor circuit 203 is configured to generate frequency signal 208 based on a frequency of a clock signal included in computer system circuit 101. Frequency sensor circuit 203 may be implemented in numerous ways that monitors a frequency of the computer system circuit. For example, frequency sensor circuit 203 may include a clock pulse counter, or any other suitable frequency sensor circuit to generate a signal indicative of a clock signal frequency of a circuit node. In various embodiments, frequency signal 208 may be a digital signal that includes multiple bits whose collective value is indicative of the clock frequency of computer system circuit 101. In such cases, change in clock frequency from one reference time period to another time period may be tracked to determine time rate of change of the frequency. In various embodiments, the reference time period may be programmable.

Software fault monitor circuit 204 is configured to generate fault signal 209 based on a program flow error of a software program or application being executed by computer system circuit 101. Software fault monitor circuit 204 may be implemented using various programmable circuit topologies. For example, software fault monitor circuit 204 may include program code stored on a readable memory that is used to detect any abnormal execution in the flow of the software of application being executed. In various embodiments, the program code includes instructions linked to corresponding checkpoint data. In such cases, fault signal 209 may include one or more bits whose value indicative of a location in the software program or application where the fault occurred. The location may be determined using result of a comparison between a particular checkpoint to a previously received checkpoint data. Software fault monitor circuit 204 is configured to detect unexpected branching in software program. To detect such unexpected branching, software fault monitor circuit 204 may be configured to compare actual program branches with previously determined checkpoints. In cases when an actual branch does not match a checkpoint, software fault monitor circuit 204 may be further configured to generate an error signal that may encode a location of the fault.

In various embodiments, changes in absolute value or the rate of change in voltage supply, temperature, clock frequency, or any suitable combination thereof, may result in timing violations in circuit paths within computer system circuit 101. Critical path monitor circuit 205 is configured to generate path signal 210 based in response to a detection of a timing violation of a reference circuit path included in computer system circuit 101. To detect such a timing violation, critical path monitor circuit 205 may be further configured to compare test data that is propagated through the reference circuit path to expected data. In response to a determination that the test data does not match the expected data, critical path monitor circuit 205 may be further configured to activate path signal 210 signaling a setup and/or hold time violation. In various embodiments, path signal 210 may include one or more bits whose value encode a particular type of failure (e.g., setup time failure) as well as the location of the failure within the reference circuit path.

In some cases, various sensor embodiments may be added to monitor circuits, including process sensors, supply rate long/short term sensors, and the like. Additionally, the sensor circuits may be initially in an inactive or stand-by mode, to reduce power consumption. In various embodiments, the sensor circuits may be activated at regular intervals. In such a fashion, activation frequency may be programmable. In a similar fashion, different ones of the sensor circuits may have different activation frequencies.

Figure 3:
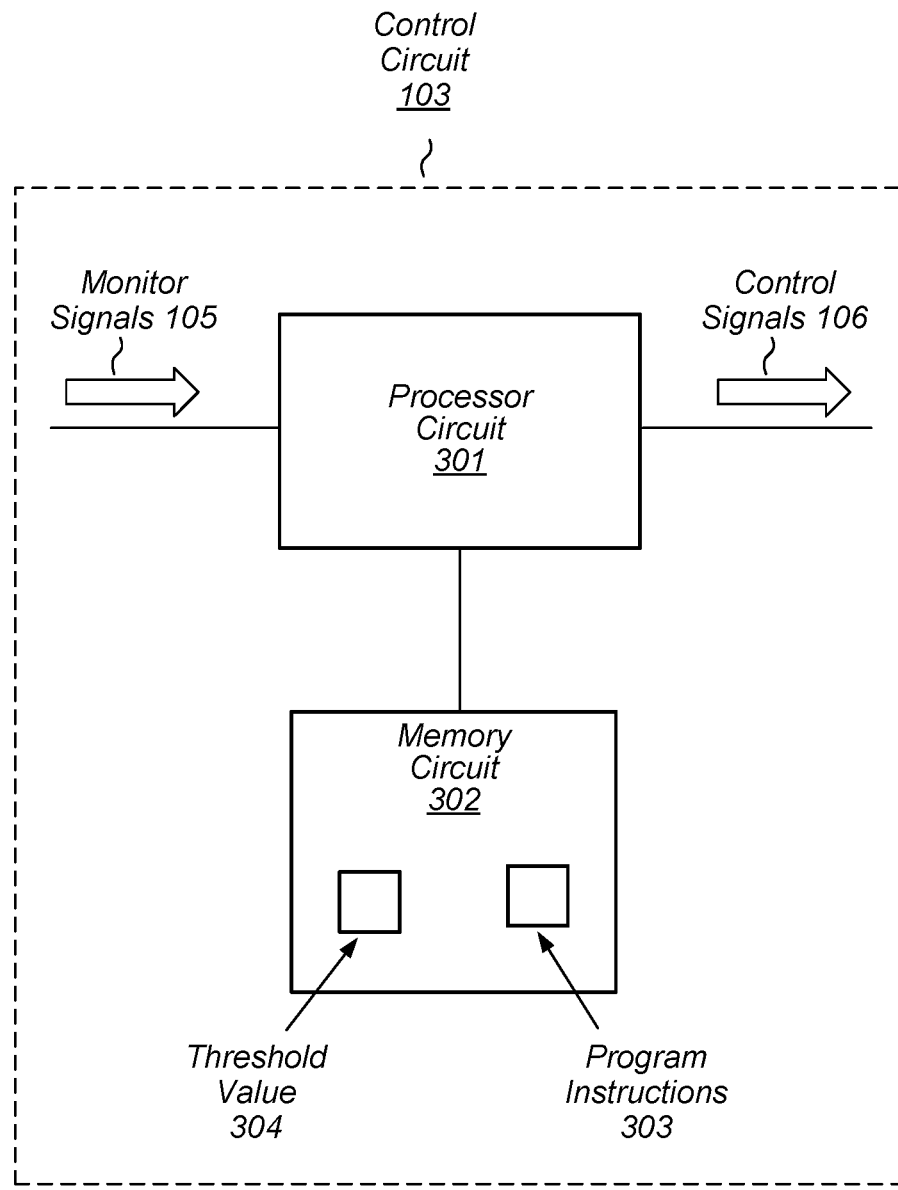
FIG. 3 illustrates a block diagram of an embodiment of a control circuit used in a computer system.

Turning to FIG. 3, a block diagram of control circuit 103 is depicted. As illustrated, control circuit 103 includes processor circuit 301 and memory circuit 302. It is noted that although a single processor circuit and memory circuit are illustrated in the embodiment of FIG. 3, in other embodiments, any suitable number of processor and memory circuits may be employed.

Processor circuit 301 is configured to generate control signals 106 using monitor signals 105. To generate control signals 106, processor circuit 301 may be further configured to execute program instructions 303. In response to executing program instructions 303, processor circuit 301 may perform operations using data indicative of monitor signals 105. In various embodiments, processor circuit 301 may be further configured to determine respective probabilities of operation parameters corresponding to monitor signals 105. In various embodiments, processor circuit 301 may be further configured to generate a combined probability by multiplying at least two of the determined probabilities.

Memory circuit 302 is configured to store program instructions 303 and threshold value 304. In various embodiments, program instructions 303 may include probability density functions of operation parameters monitored by monitor circuit 102. In various embodiments, shape parameters used by the probability density functions may be generated during a training operation. Program instructions 303 may further include instructions for combining probabilities values determined using values of monitor signals 105, and then comparing the combined probability to threshold value 304.

In various embodiments, threshold value 304 and program instructions 303 may be stored in memory circuit 302 during a boot or reset operation. In some cases, program instructions 303 and/or threshold value 304 may be updated during a training operation. Such training operations may be performed at regulator intervals, or in response to an external event, such as a change in location of computer system 100.

In various embodiments, memory circuit 302 may include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although a single memory circuit is illustrated in FIG. 3, in other embodiments, any suitable number of memory circuits may be employed. In some cases, threshold value 304 may be stored in a one-time programmable (OTP) memory circuit.

Although control circuit 103 is depicted as being implemented using a processor circuit coupled to a memory circuit, in other embodiments, control circuit 103 may be implemented using any other suitable circuit configured to perform machine learning operations. For example, control circuit 103 may be implemented using an artificial neural network (referred to as a "neural engine"). In such cases, the artificial neural network may be trained while computer system 100 is operating under know operating conditions. Once trained, the artificial neural network may generate control signals 106 in response to a combined probability of one or more operation parameters of computer system circuit 101 exceed threshold 108.

In various embodiments, the training operation may include determining coefficients or parameters for a function. Such functions can include a power series expansion, with each term weighted by a corresponding coefficient. In some cases, the functions may include a probability density function (PDF) and the training operation can include determining one or more shape parameters for the PDF using test data provided during the training operation.

Figure 4:
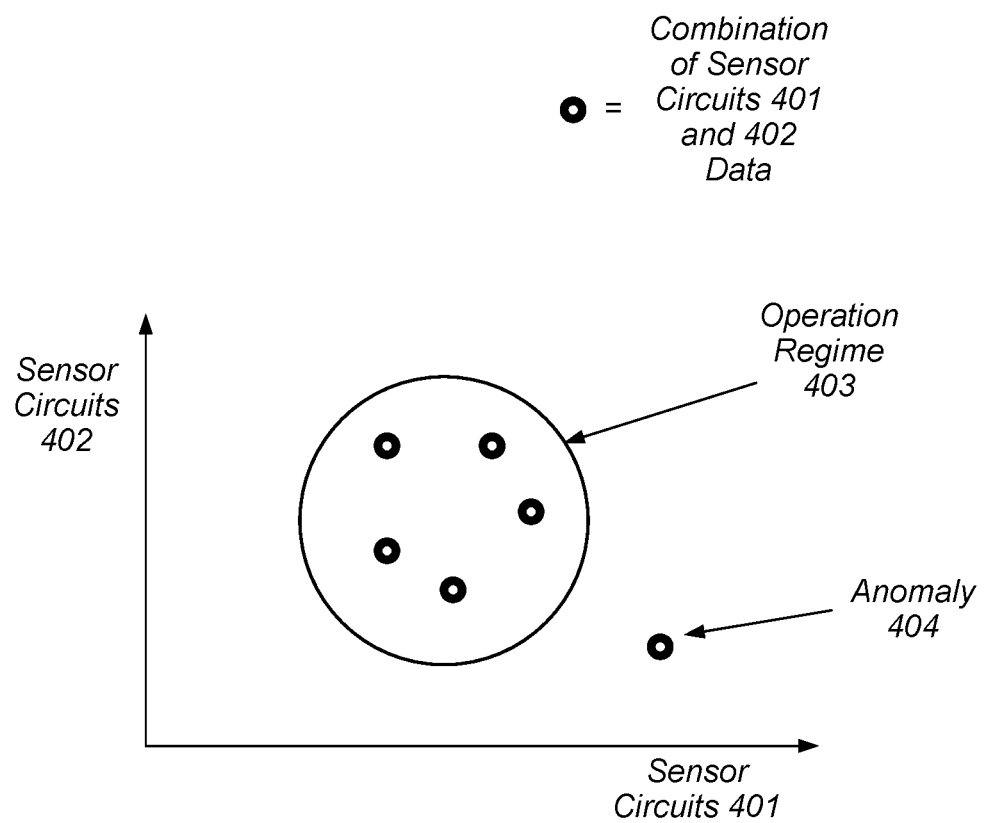
FIG. 4 illustrates a diagram depicting anomaly detection of normally distributed operation parameters.

Turning to FIG. 4, a combination of operation parameters as measured by two sensor circuits, e.g., sensor circuit 401 and sensor circuit 402, is illustrated. A given one of the dots in FIG. 4 correspond to a combine probability value generated using respective probabilities of operation parameters measured by sensor circuits 401 and sensor circuits 402. As mentioned above, a given sensor circuit can generate a distribution of values for a particular measurement of an operating condition. The shape of a given sensor circuit distribution can be described by a probability density function whose shape parameters are determined during a machine learning training operation. It is noted that although FIG. 4 depicts combined probabilities for two sensor circuits, in other embodiments, values from more than two sensor circuits may be used to generate the combined probabilities. In such cases, the combine probabilities are located within in an N-dimensional space (where N is the number of sensor circuits).

In various embodiments, operation regime 403 may be calculated based on a density estimation technique. In such cases, control circuit 103 tests a function to determine a plurality of probabilities that the corresponding plurality of operation parameters are within corresponding operational regimes. In a similar fashion, control circuit 103 determines one or more of the probabilities of operation parameters outside of operation regime 403. In such embodiments, probability outside of operation regime 403 is detected as anomaly 404. As used and described herein, an operation regime is a range of operation characteristics of a computer system that allow the computer system to achieve desired performance metrics such as speed, power consumption, and the like. In various embodiments, a threshold value based on a combination of the operation characteristics may be used to identify particular combinations of operation characteristics that fall within or outside of a particular operation regime.

Assuming the variation of the sensor circuits are independent, a combination of probabilities of operation parameters may be calculated by multiplying different probabilities. As described below, operation regime 403 may be determined during a training operation where different combined probabilities are judge to correspond to computer system 100 operating within (or outside of) operation regime 403. Any combined probability outside of operation regime 403 is detected as an anomaly, e.g., anomaly 404. In such cases, operation regime 403 is set for best precision and recall tradeoff. For example, two or more sensor circuits may have different threshold to increase precision by decreasing the number of false positive detection. In a similar fashion, correlation between the different sensor circuits may increase the number of false negative detection, which in turn, decreases recall and can have an impact on design margin of a computer system. Such cases may reduce design margins by counting some errors for multiple times, which in turn, precision may not improve by optimizing threshold of each sensor circuit independently.

Figure 5:
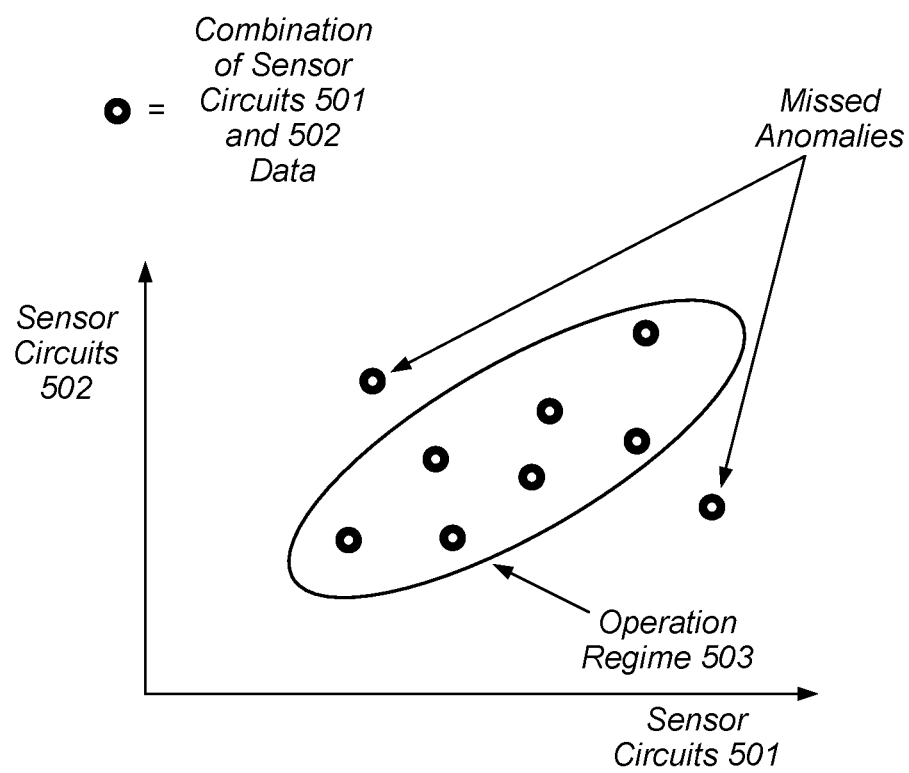
FIG. 5 illustrates a diagram depicting anomaly detection of correlated operation parameters.

In some cases, the variation of different sensor circuits may be correlated. For example, a sensor circuit that detects a frequency of a clock signal may be correlated to a sensor circuit that detects power supply voltage level since the power supply voltage level can affect the clock generation circuits. In such cases, the combined probabilities of different sensor circuits may have a different arrangement within an N-dimensional space associated with the sensor circuits. An example for two correlated sensor circuits is depicted in FIG. 5, which illustrates a combination of operation parameters as measured by two sensor circuits, e.g., sensor circuits 501 and sensor circuits 502. In a similar fashion to FIG. 4, a given one of the dots in FIG. 5 correspond to a combine probability value generated using respective probabilities of operation parameters measured by sensor circuit 501 and sensor circuit 502. As mentioned above, a given sensor circuit can generate a distribution of values for a particular measurement of an operating condition. The shape of a given sensor circuit distribution can be described by a probability density function whose values are determined during a machine learning training operation.

In contrast to FIG. 4, the respective probabilities from sensor circuits 501 and 502 may be combined using operations other than multiplication. For example, rather than treating the probabilities associated with sensor circuits 501 and 502 as independent univariate Gaussian distributions, the probabilities associated with sensor circuits 501 and 502 may be combined into a single bivariate Gaussian distribution. It is noted that, in other embodiments, if more than two sensor circuits are employed, a corresponding multivariate Gaussian distribution may be employed. In the case of a multivariate Gaussian distribution, combining the probabilities associated with sensor circuits 501 and 502 may include determining a covariance matrix using the respective values.

Assuming two or more operation parameters of sensor circuits are correlated, a threshold value associated with operation regime 503 may be determined by iteratively evaluating test operating conditions and adjusting the threshold value associated with operating regime 503 to make sure known good combinations of operating conditions fall within operating regime 503. By using combined probability values for sensor circuits that are correlated, combinations of operation parameters that would otherwise have been included as valid operating conditions, may be correctly identified as being outside of operating regime 503.

In some cases, some of the sensor circuits may be correlated, while other sensor circuits are not correlated. For example, in FIG. 2, although thermal sensor circuit 201 and voltage sensor circuit 202 may have interaction, these may not interact with operation parameters of software fault monitor circuit 204. In such cases, correlation of operation parameters of thermal sensor circuit 201 and voltage sensor circuit 202 may be applied to the calculation of operation regime 503, while an interaction factor of software fault monitor circuit 204 may set to zero. The interaction factor may be defined as a weighted value corresponds to the correlation between the thresholds of operation parameters. As described above, operation regime 503 may be determined during a training operation where different combined probabilities are judge to correspond to computer system 100 operating within (or outside of) operation regime 503.

Figure 6:
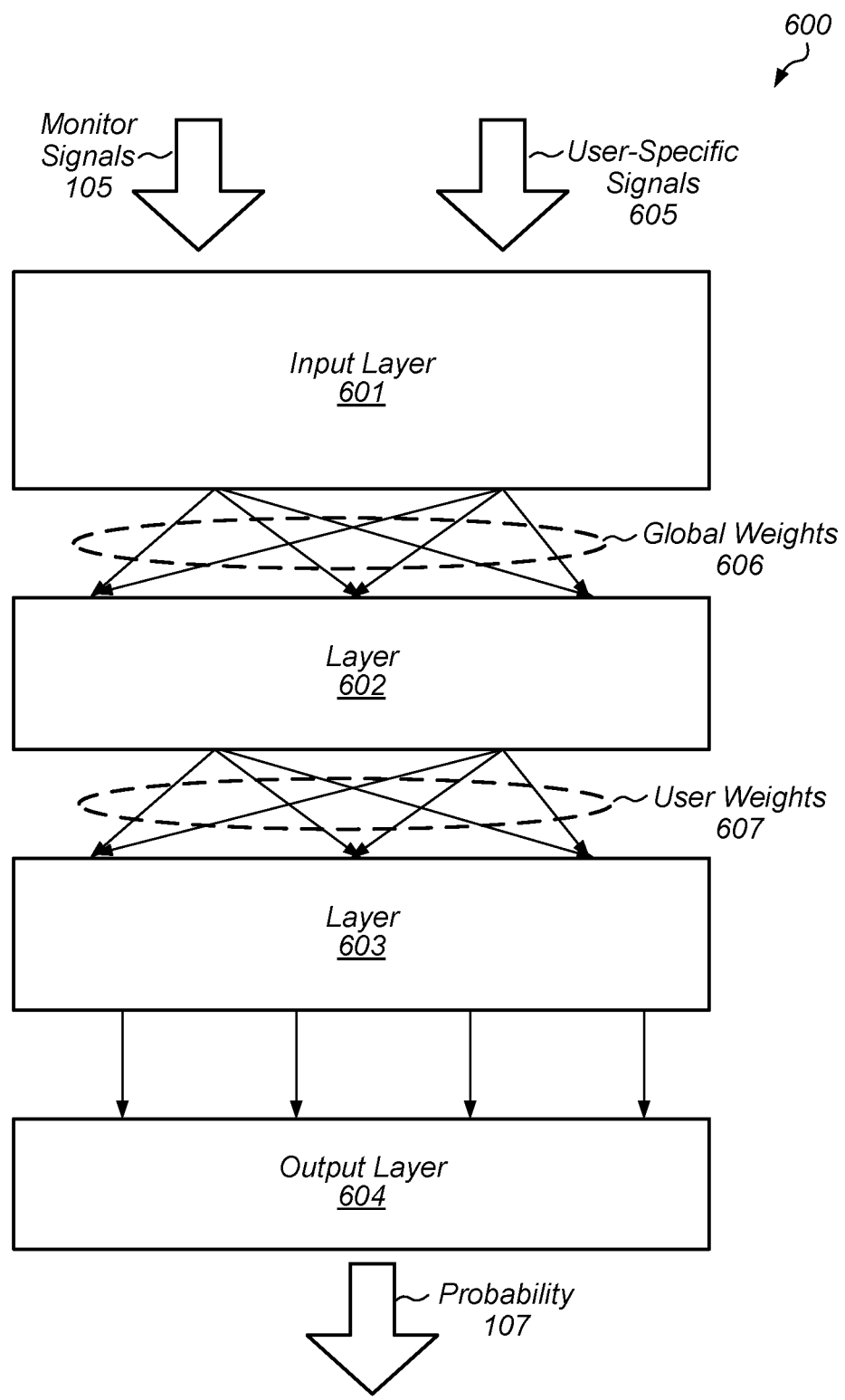
FIG. 6 illustrates a block diagram of an embodiment of a multi-layer Machine Learning system.

As described above, coefficients of a function, shape parameters of a probability density function, and the like, may be determined via a machine learning system. Such machine learning systems may include multiple layers and may be implemented as dedicated neural engines, or by a general-purpose processor configured to execute a software program or application. A block diagram of an embodiment of a multi-layer machine learning system is depicted in FIG. 6. As illustrated, machine learning system 600 includes input layer 601, layer 602, layer 603, and output layer 604.

Input layer 601 is configured to receive monitor signals 105 and user-specific signals 605, and generate output signals that have corresponding ones of global weights 606 applied to them. In various embodiments, user-specific signals 605 encodes user data that can be used during training. As used and defined herein, user data refers to data specific to a particular user of a computer system or to a particular version of a computer system. For example, user data can include location information, user preferences such as screen brightness, and the like.

In various embodiments, global weights 606 may be determine during an initial machine learning operation. The initial machine learning operation may be performed at a factory as part of the manufacturing process of a computer system. Alternatively, global weights 606 may be updated when the computer system is in the field as part of a operating system or other software update.

Layer 602 is configured to generate additional output signals using the signals generated by input layer 601 weighted by global weights 606. The output signals of layer 602 are weighted by user weights 607. It is noted that, in some embodiments, the output signals of input layer 601 may be re-ordered before being received by layer 602. In various embodiments, user weights 607 may be updated during machine learning operations performed when the computer system is in the field. The additional machine learning operations may be performed at regular intervals, in response to a request by a user, in response to a change in operation parameter (e.g., a change in location), or any other suitable condition. By allowing user weights 607 to be updated in the field, machine learning system 600 can adapt to changes in operating conditions that are specific to a given user or version of a computer system.

Layer 603 is configured to process the output signals of layer 602 weighted by user weights 607. It is noted that the output signals of layer 602 may be re-ordered before being received by layer 603. In some cases, layer 603 may be configured to generate output signals that correspond to probabilities associated with corresponding ones of monitor signals 105.

Output layer 604 is configured to generate probability 107 using the output signals of layer 603. To generate probability 107, output layer 604 may be configured to combine different ones of the output signals of layer 603. For example, in some embodiments, output layer 604 may be configured to multiply different ones of the output signals of layer 603 to generate probability 107. It is noted that although only two processing layers, i.e., the layers between input layer 601 and output layer 604, are depicted, in other embodiments, any suitable number of layers between input layer 601 and output layer 604 may be employed.

Figure 7:
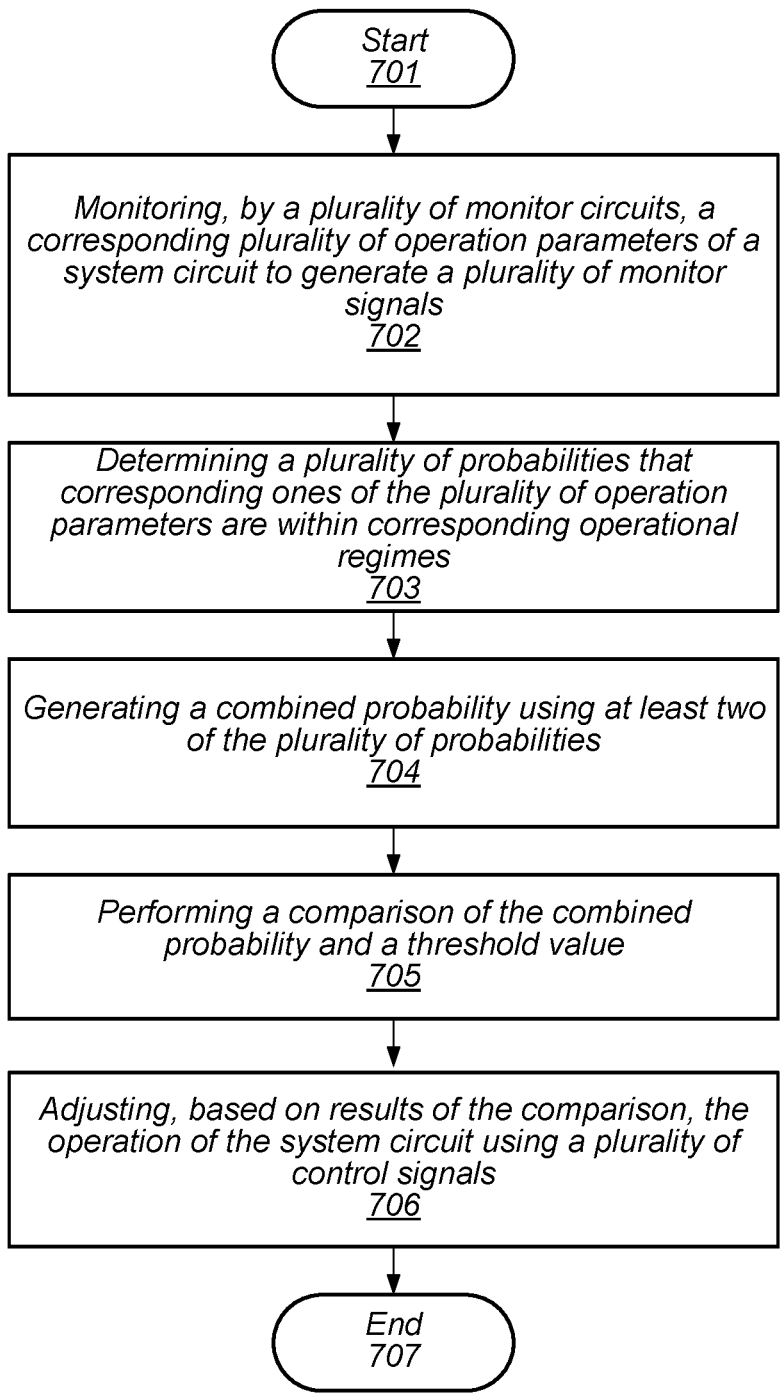
FIG. 7 illustrates a flow diagram depicting an embodiment of a method for detecting an anomaly in the operation of a computer system.

Turning to FIG. 7, a flow diagram depicting an embodiment of a method for detecting an anomaly in the operation of a computer system is illustrated. The method, which may be applied to various computer systems, such as computer system 100, begins in block 701.

The method includes monitoring, by a plurality of monitor circuits, a corresponding plurality of operation parameters of a computer system circuit to generate a plurality of monitor signals (block 702). In various embodiments, the plurality of monitor signals may include a first monitor signal whose value is indicative of a magnitude of a corresponding operating parameter at a given point in time, and a second monitor signal whose value is indicative of a time rate of change of the corresponding parameter over a period of time.

The method also includes determining a plurality of probabilities that the corresponding plurality of operation parameters are within corresponding operational regimes (block 703). In various embodiments, determining the plurality of probabilities includes integrated a given one of the plurality of monitor signals. It is noted that in some cases, integration is just one method that can be used to process the monitor signals, and that, in other embodiments, any suitable method may be used to process the monitor signals. In some embodiments, determining the plurality of probabilities includes calculating a given probability of the plurality of probabilities using a function derived from test data as described below.

The method further includes generated a combine probability using at least two of the plurality probabilities (block 704). In some embodiments, generating the combined probability may include multiplying a first probability of the plurality of probabilities and a second probability of the plurality of probabilities.

The method also includes performing a comparison of the combined probability and a threshold value (block 705). As described below, the threshold value may be determined in an iterative process that adjusts the threshold value until know good sets of operation are properly identified as being acceptable.

The method further includes adjusting, based on results of the comparison, the operation of the computer system circuit using a plurality of control signals (block 706). In some embodiments, adjusting the operation of the computer system circuit includes deactivating a clock signal included in the computer system circuit. The method concludes in block 707.

Figure 8:
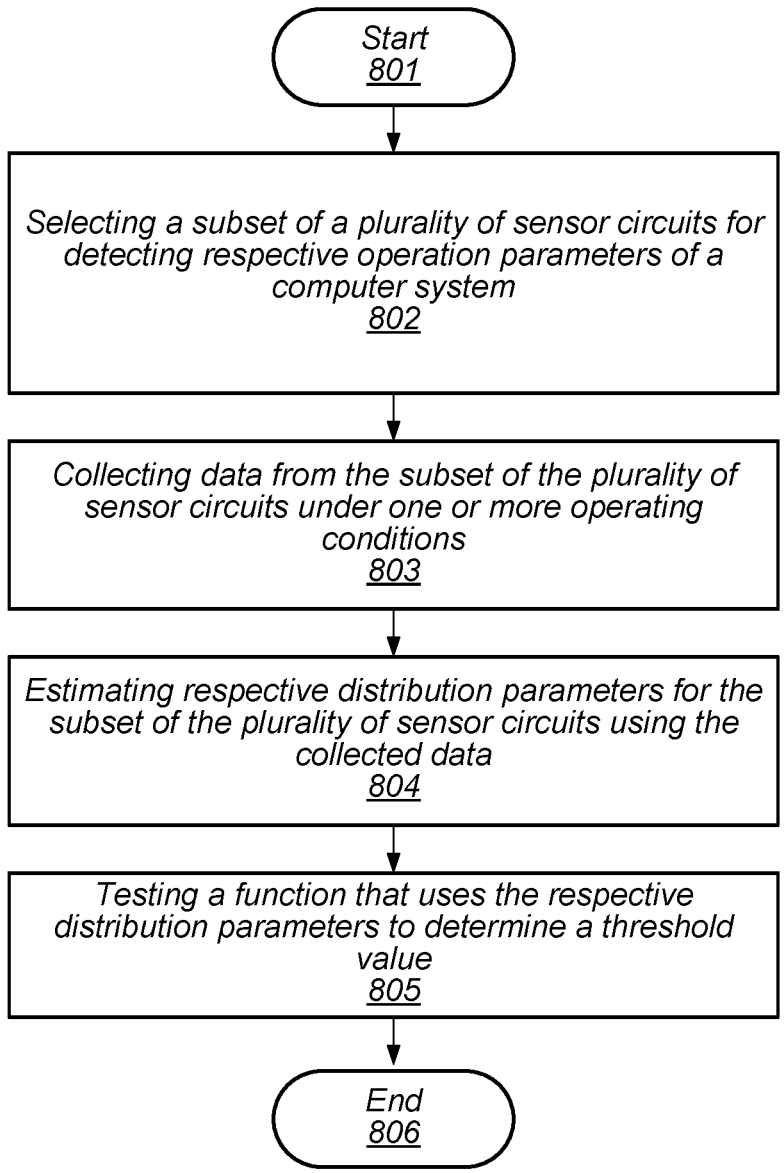
FIG. 8 illustrates a flow diagram depicting an embodiment of a method for training a computer system to detect anomalous behavior.

Turning to FIG. 8, a flow diagram depicting an embodiment of a method for training a computer system to detect anomalous behavior is illustrated. The method, which may be applied to various computer systems, such as computer system 100, begins in block 801. In some embodiments, the training method may be initiated at the factory. Alternatively, the training method may be initiated in response to a user request, or after particular time periods have elapsed since the start of operation of the computer system. In some cases, factory-based training may employ some operation parameters of the computer system, while training performed in the field, may employ a different set of operation parameters of the computer system.

The method includes selecting a subset of a plurality of sensor circuits for detecting respective operation parameters of a computer system (block 802). As described above, different ones of the plurality of sensor circuits detect corresponding operation parameters of the computer system. For example, one sensor circuit may determine a voltage level of a regulated power supply node in the computer system, while another sensor may determine a temperature of the computer system. It is noted that the computer system may include multiple sensor circuits, and that different subsets of the multiple sensor circuits may be used in different training operations.

The method also includes collecting data from the subset of the plurality of sensor circuits under one or more operating conditions (block 803). During the training operation, the operating conditions for the computer system are modified. Such modifications can include varying the temperature of the computer system, changing a voltage level of a power supply provided to the computer system, and the like. In some cases, various application or software programs may be executed as part of the different operating conditions.

The method further includes estimating respective distribution parameters for the subset of the plurality of sensor circuits using the collected data (block 804). In various embodiments, estimating the respective distribution parameters may include determining a mean value for a distribution of a given sensor circuit, and determining a standard deviation value for the distribution of the given sensor circuit. It is noted, that some of the subset of the plurality of sensor circuits may not be Gaussian, in which case, the distribution parameters may correspond to shape parameters corresponding to the type of non-Gaussian distribution. In some embodiments, determining the distribution parameters may further includes performing a machine-learning operation using the collected data.

The method also includes testing a function that uses the respective distribution parameters to determine a threshold value (block 805). In some embodiments, testing the function may include determining a probability value based on a portion of the collected data corresponding to a given one of the operating conditions, and modifying the threshold value based on the determined probability value. The method concludes in block 806.

Figure 9:
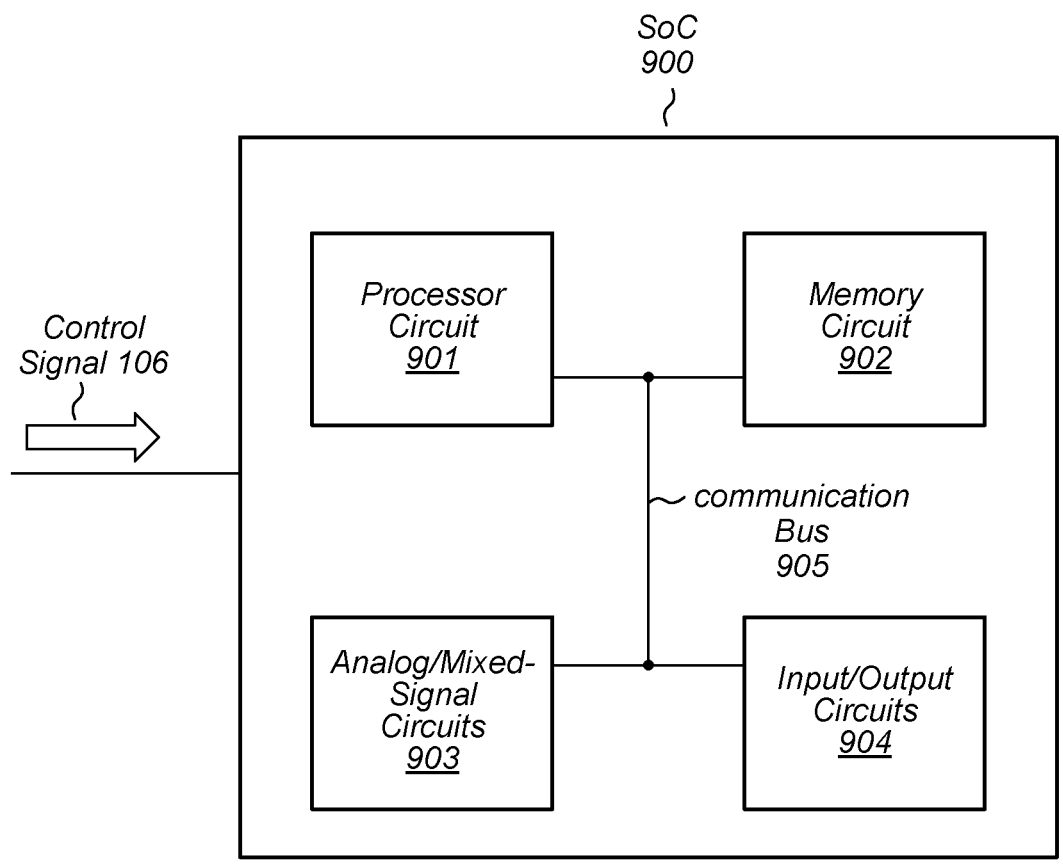
FIG. 9 is a block diagram of an embodiment of a system-on-a-chip.

A block diagram of a system-on-a-chip (denoted "SoC 900") is illustrated in FIG. 9. In various embodiments, SoC 900 may correspond to computer system circuit 101 and may be configured for use in a desktop computer, server, or in a mobile computing application such as, e.g., a tablet, laptop computer, or wearable computing device. As illustrated, SoC 900 includes processor circuit 901, memory circuit 902, analog/mixed-signal circuits 903, and input/output circuits 904, each of which is coupled to communication bus 905.

It is noted that each of processor circuit 901, memory circuit 902, analog/mixed-signal circuits 903, and input/output circuits 904 may include one or more of sensor circuits such as those depicted in monitor circuits 102. In various embodiments, SoC 900 may adjust one or more operating parameters using control signal 106. For example, control signal 106 may be used to adjust frequencies of clocks signals, voltage levels of power supply nodes, activation of sleep modes of signals, and the like.

Processor circuit 901 may, in various embodiments, be representative of a general-purpose processor that performs computational operations. For example, processor circuit 901 may be a central processing unit (CPU) such as a microprocessor, a microcontroller, an application-specific integrated circuit (ASIC), or a field-programmable gate array (FPGA).

Memory circuit 902 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 9, in other embodiments, any suitable number of memory circuits may be employed.

Analog/mixed-signal circuits 903 may include a crystal oscillator circuit, a phase-locked loop circuit, an analog-to-digital converter (ADC) circuit, and a digital-to-analog converter (DAC) circuit (all not shown). In some embodiments, analog/mixed-signal circuits 903 may include one or more sensor circuits configured to measure operating parameters (e.g., temperature) of SoC 900.

Input/output circuits 904 may be configured to coordinate data transfer between SoC 900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 904 may be configured to implement a version of Universal Serial Bus (USB) protocol or IEEE 1394 (Firewire®) protocol.

Input/output circuits 904 may also be configured to coordinate data transfer between SoC 900 and one or more devices (e.g., other computing systems or integrated circuits) coupled to SoC 900 via a network. In one embodiment, input/output circuits 904 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 904 may be configured to implement multiple discrete network interface ports.

Figure 10:
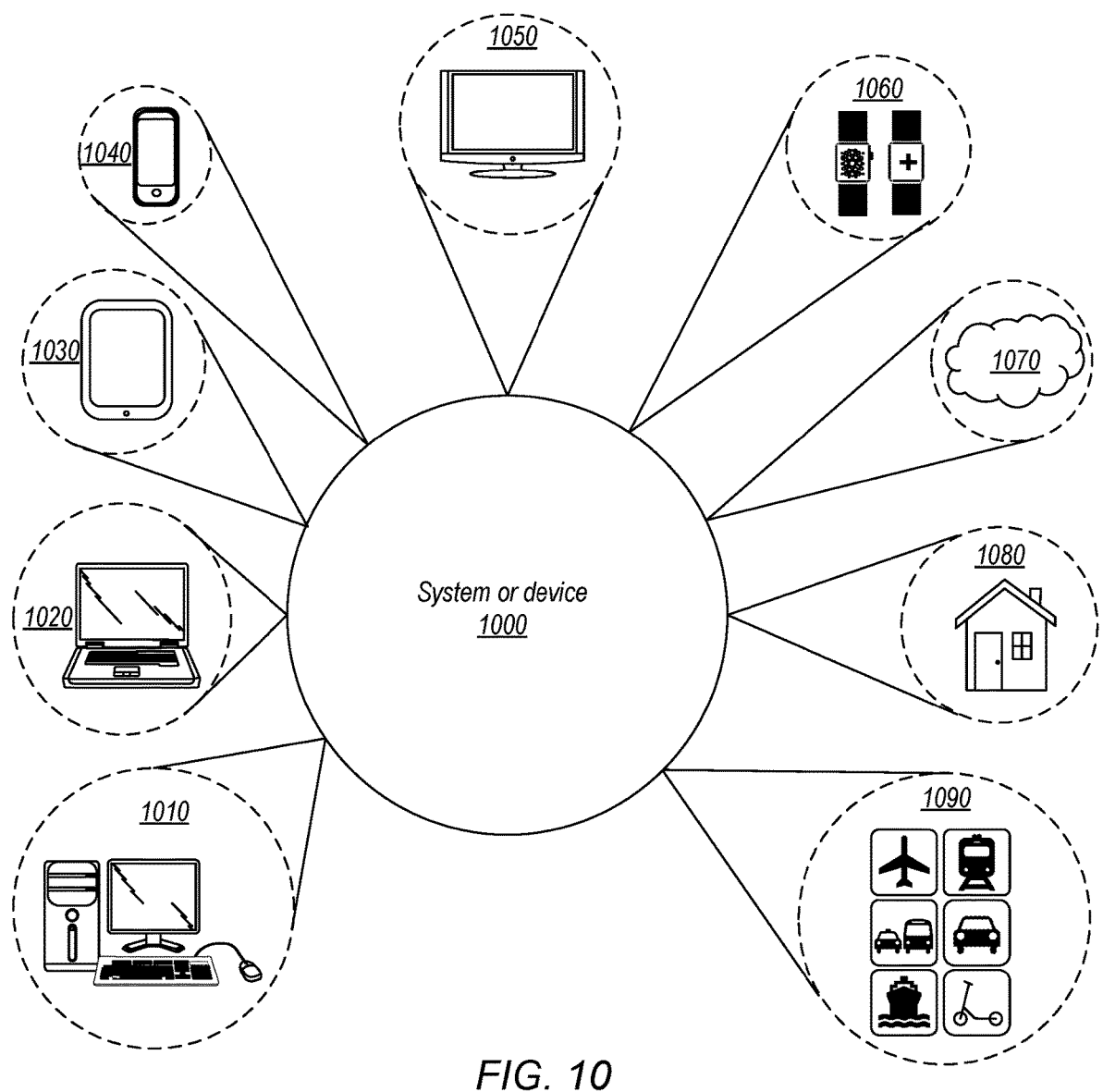
FIG. 10 is a block diagram of an embodiment of a computer system that may include operation parameter monitor circuits.

Turning now to FIG. 10, various types of systems that may include any of the circuits, devices, or systems discussed above are illustrated. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Figure 11:
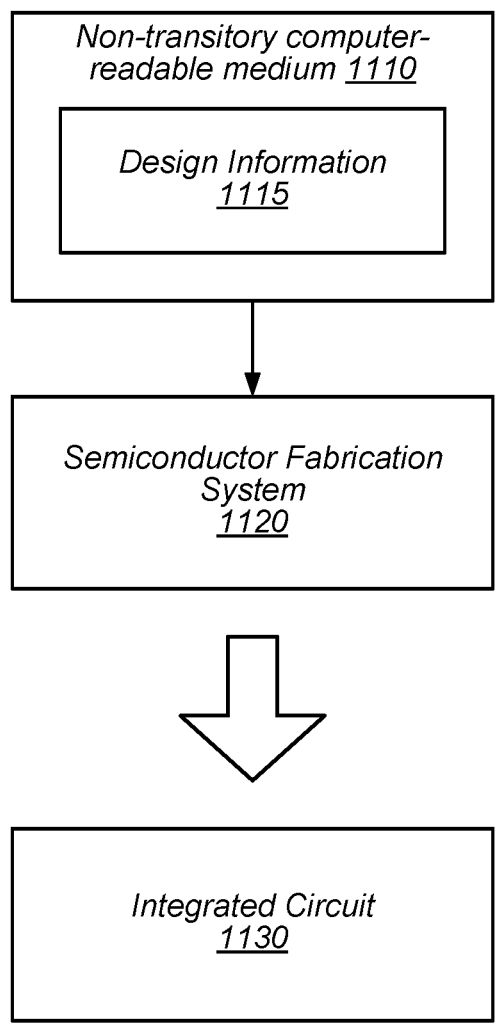
FIG. 11 illustrates an example of a non-transitory computer-readable storage medium that stores circuit design information.

FIG. 11 is a block diagram illustrating an example of a non-transitory computer-readable storage medium that stores circuit design information, according to some embodiments. In the illustrated embodiment, semiconductor fabrication system 1120 is configured to process the design information 1115 stored on non-transitory computer-readable storage medium 1110 and fabricate integrated circuit 1130 based on the design information 1115.

Non-transitory computer-readable storage medium 1110 may comprise any of various appropriate types of memory devices or storage devices. Non-transitory computer-readable storage medium 1110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums, which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system, such as semiconductor fabrication system 1120, for example. In some embodiments, design information 1115 may include a netlist that specifies elements of a cell library, as well as their connectivity. One or more cell libraries used during logic synthesis of circuits included in integrated circuit 1130 may also be included in design information 1115. Such cell libraries may include information indicative of device or transistor level netlists, mask design data, characterization data, and the like, of cells included in the cell library.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown or described herein. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
    a computer system circuit implemented on an integrated circuit, wherein the integrated circuit is included in a mobile computing device;
    a plurality of monitor circuits, implemented on the integrated circuit, including a given monitor circuit configured to monitor a given operation parameter of a plurality of operation parameters of the computer system circuit to generate a corresponding one of a plurality of monitor signals; and
    a control circuit, implemented on the integrated circuit, configured to:
    receive the plurality of monitor signals and one or more user-specific signals, wherein user-specific signals encode data specific to a particular user, including user preferences for operation of the computer system circuit;
    input the plurality of monitor signals and one or more user-specific signals into a first layer of a machine learning system to generate a plurality of weighted signals;
    input the plurality of weighted signals into one or more subsequent layers of the machine learning system to determine a respective plurality of individual probabilities, wherein a given one of the individual probabilities is indicative of a probability that the given operation parameter is within a corresponding operation range;
    generate a combined probability using the plurality of individual probabilities, wherein ones of the plurality of individual probabilities correspond to different ones of the plurality of operation parameters;
    perform a comparison of the combined probability to a threshold value; and
    adjust, based on a result of the comparison, operation of the computer system circuit using a plurality of control signals.

2. The apparatus of claim 1, wherein to adjust the operation of the computer system circuit, the control circuit is further configured to deactivate a clock signal included in the computer system circuit.

3. The apparatus of claim 1, wherein the plurality of monitor signals includes:
    a first monitor signal whose value is indicative of a magnitude of a corresponding operation parameter at a given time point; and a second monitor signal whose value is indicative of a time rate of change of the corresponding operation parameter over a given time period.

4. The apparatus of claim 1, wherein to generate the combined probability, the control circuit is further configured to multiply at least a first probability of the plurality of individual probabilities and a second probability of the plurality of individual probabilities.

5. The apparatus of claim 1, wherein the plurality of monitor circuits includes a temperature monitor circuit configured to generate, based on a temperature of the computer system circuit, a temperature monitor signal of the plurality of monitor signals.

6. The apparatus of claim 1, wherein to determine the plurality of individual probabilities, the control circuit is further configured to integrate a given one of the plurality of monitor signals.

7. A method, comprising:
monitoring, by a plurality of monitor circuits, a corresponding plurality of operation parameters of a computer system circuit to generate a plurality of monitor signals, wherein the computer system circuit and the plurality of monitor circuits are implemented on a same integrated circuit that is included in a mobile computing device;
receiving the plurality of monitor signals and one or more user-specific signals, wherein user-specific signals are indicative of data specific to a current user, including user preferences for operation of the computer system circuit;
using a first layer of a machine learning system to generate a plurality of weighted signals based on the plurality of monitor signals and one or more user-specific signals into;
using one or more subsequent layers of the machine learning system to generate, based on the plurality of weighted signals, a plurality of individual probabilities that the corresponding plurality of operation parameters are within corresponding operational regimes;
combining at least two of the plurality of individual probabilities to generate a combined probability, wherein the at least two individual probabilities correspond to different ones of the plurality of operation parameters;
performing a comparison of the combined probability and a threshold value; and
adjusting, based on a result of the comparison, operation of the computer system circuit using a plurality of control signals.

8. The method of claim 7, wherein adjusting the operation of the computer system circuit includes deactivating a clock signal included in the computer system circuit.

9. The method of claim 7, wherein the plurality of monitor signals includes:
a first monitor signal whose value is indicative of a magnitude of a corresponding operation parameter at a given time point; and
a second monitor signal whose value is indicative of a time rate of change of the corresponding operation parameter over a given time period.

10. The method of claim 7, wherein combining the at least two of the plurality of individual probabilities includes multiplying a first probability of the plurality of individual probabilities and a second probability of the plurality of individual probabilities.

11. The method of claim 7, wherein monitoring the corresponding plurality of operation parameters includes determining a temperature of the computer system circuit.

12. The method of claim 7, wherein determining the plurality of individual probabilities includes integrating, by a control circuit, a given one of the plurality of monitor signals.

13. The method of claim 7, wherein determining the plurality of individual probabilities includes calculating a given probability of the plurality of individual probabilities using a function derived from test data.

14. An apparatus, comprising:
a computer system circuit implemented on a first integrated circuit;
a plurality of monitor circuits implemented on the first integrated circuit including a given monitor circuit configured to monitor a given operation parameter of a plurality of operation parameters of the computer system circuit to generate a corresponding one of a plurality of monitor signals; and
a control circuit implemented on a second integrated circuit and configured to:
collect data from the plurality of monitor signals;
receive one or more user-specific signals that include data specific to a current user, including user preferences for operation of the computer system circuit;
input the plurality of monitor signals and one or more user-specific signals into a first layer of a machine learning system to generate a plurality of weighted signals;
input the plurality of weighted signals into one or more subsequent layers of the machine learning system to determine a respective plurality of individual probabilities that corresponding operation parameters are within corresponding operational ranges, wherein a given one of the of the plurality of individual probabilities corresponds to a given one of the plurality of monitor signals;
generate, based on two or more of the plurality of individual probabilities, a combined probability, wherein the two or more individual probabilities correspond to different ones of the plurality of operation parameters; and
adjust, based on a comparison of the combined probability to a threshold value, operation of the computer system circuit using a plurality of control signals; and
wherein the first and second integrated circuits are included in a mobile computing device.

15. The apparatus of claim 14, wherein the control circuit is further configured to, in response to activation of a training mode:
select one or more of the plurality of monitor signals;
collect, under one or more operating conditions, data from the selected monitor signals;
estimate respective distribution parameters for the selected monitor signals; and
test a function that uses the respective distribution parameters to determine the threshold value.

16. The apparatus of claim 14, wherein the plurality of monitor circuits includes a temperature monitor circuit.

17. The apparatus of claim 15, wherein the control circuit is further configured to activate the training mode after a particular time period has elapsed.

18. The apparatus of claim 15, wherein the control circuit is further configured to activate the training mode in response to a user request.

19. The apparatus of claim 15, wherein to test the function, the control circuit is further configured to:
- set one or more of the plurality of operation parameters outside of a particular operating regime;
- determine a combined probability training value using data indicative of the plurality of monitor signals gathered with corresponding values of the one or more of the plurality of operation parameters outside the particular operating regime;
- perform a comparison of the combined probability training value and the threshold value; and
- adjust the threshold value using results of the comparison.

20. The apparatus of claim 19, wherein to determine the combined probability training value, the control circuit is further configured to:
- determine a plurality of individual probabilities that the plurality of operation parameters are within corresponding operational regimes using the data indicative of the plurality of monitor signals gathered with the corresponding values of the one or more of the plurality of operation parameters outside the particular operating regime; and
- combining at least two of the plurality of individual probabilities to generate the combined probability training value.

* * * * *